United States Patent [19]
Chepaitis

[11] Patent Number: 4,737,108
[45] Date of Patent: Apr. 12, 1988

[54] TACTILE CODE FOR THE VISUALLY IMPAIRED AND BLIND

[76] Inventor: Elia V. Chepaitis, 370 McKinley Ave., New Haven, Conn. 06515

[21] Appl. No.: 41,327

[22] Filed: Apr. 22, 1987

[51] Int. Cl.⁴ .............................................. G09B 21/00
[52] U.S. Cl. ..................................................... 434/113
[58] Field of Search ................................ 434/113, 114

[56] References Cited

U.S. PATENT DOCUMENTS 3,363,339  1/1968  Place ..................................... 434/113

Primary Examiner—Gregory E. McNeil
Attorney, Agent, or Firm—Mason, Fenwick & Lawrence

[57] ABSTRACT

A tactile code for use by visually impaired and blind persons comprising embossed alphabet symbols representing the letters of the conventional Roman alphabet and embossed numeral symbols representing the conventional Arabic numerals. All of the alphabet symbols and the numeral symbols comprise at least a frame, and at least some of the alphabet symbols and numeral symbols also comprise an interior portion surrounded by the frame. The alphabet symbols are divided into four regions, the alphabet symbols in the first and third regions having a circular frame and the alphabet symbols in the second and fourth regions having a square frame. Each of the alphabet symbols embodies at least a physical association with its corresponding capital letter of the Roman alphabet. The numeral symbols all have a diamond frame, and each of the numeral symbols embodies at least a logical or physical association with its corresponding Arabic numeral. Capital letters of the Roman alphabet are represented by alphabet symbols having double frames.

14 Claims, 2 Drawing Sheets

FIG-1
FIG-2
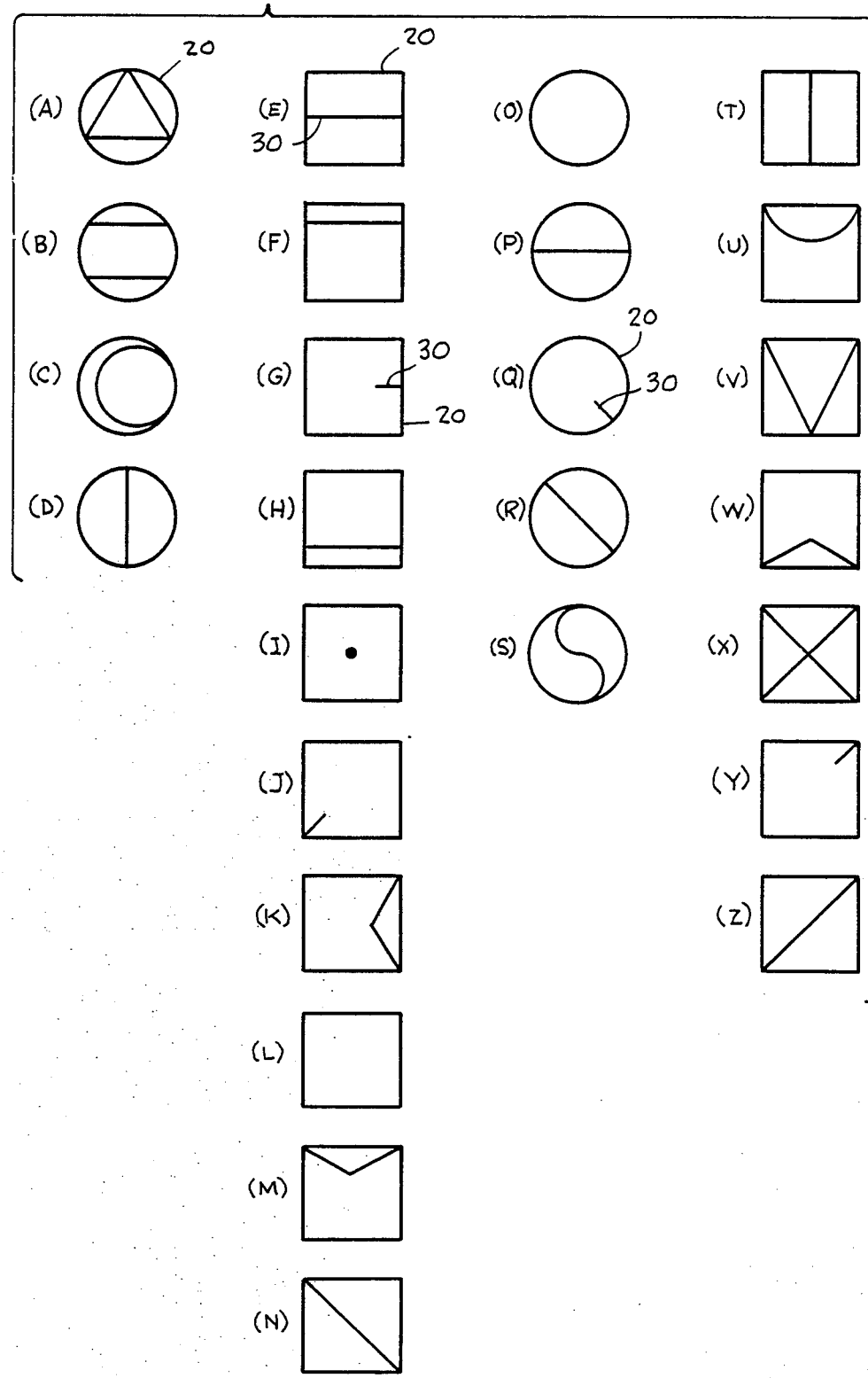
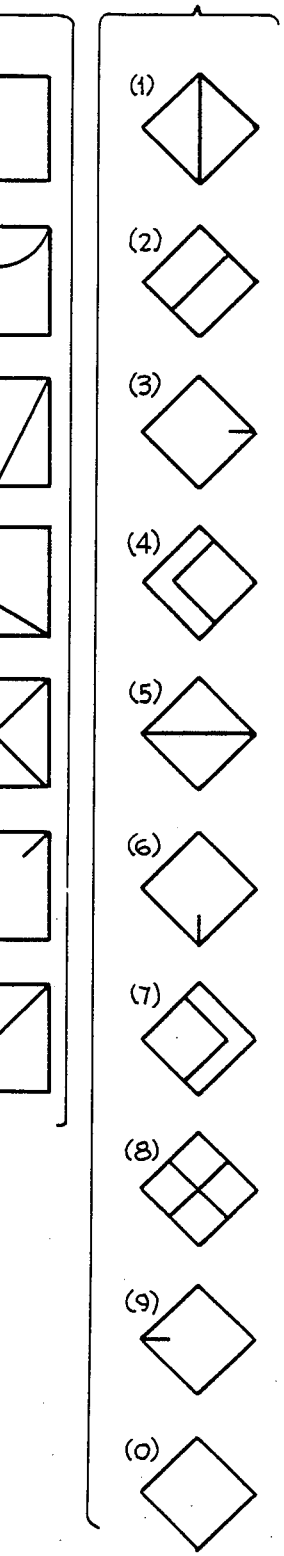

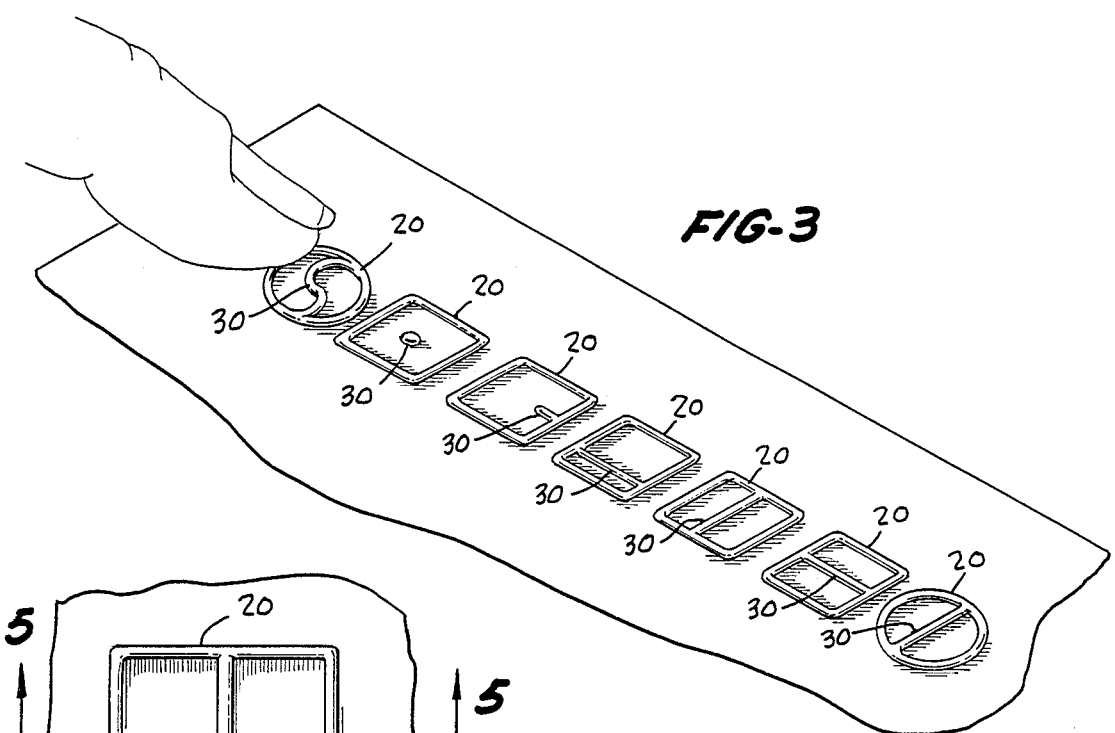
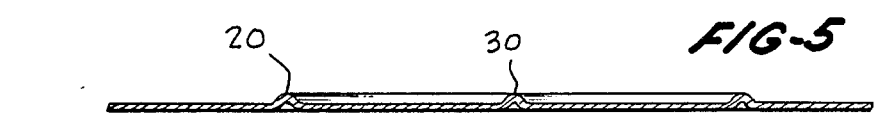
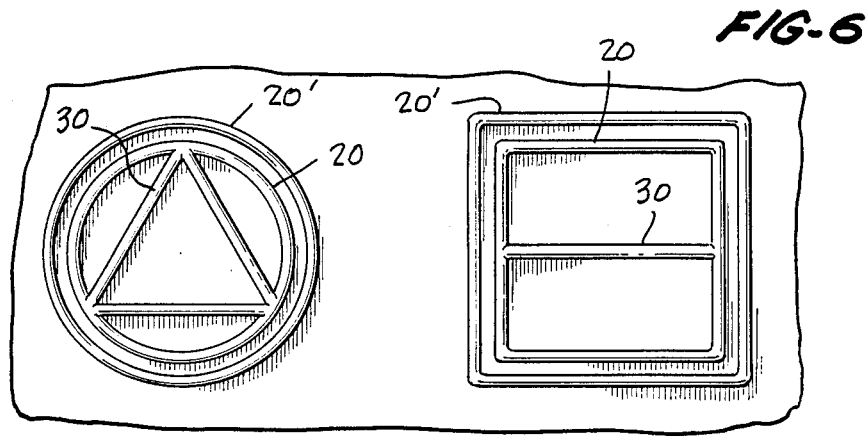

TACTILE CODE FOR THE VISUALLY IMPAIRED AND BLIND

BACKGROUND OF THE INVENTION

The present invention is directed to the field of tactile codes for the visually impaired and blind, and is more specifically directed to embossed symbols which represent the letters of the alphabet and the Arabic numerals 0-9 which can be traced with the fingertips.

The conventional means for conveying written information to visually impaired or blind persons has long been the braille code. Braille is a tactile code in which each of the letters of the conventional Roman alphabet and each of the conventional arabic numerals is represented by a combination of raised dots peculiar to that letter or numeral. The field in which a single letter or numeral is represented is a matrix of six dots, three dots high by two dots wide. The code for the letters A through J are the same codes as for the numerals 1 through 9 and 0, so an extra code is provided to notify the reader that the code immediately following is to be interpreted as a numeral. A second extra code notifies the reader that the code immediately following is to be read as a capital letter.

The production of braille text thus is labor intensive and difficult, and learning to read braille text requires significant prowess and tactile acuity. Moreover, because the braille code bears little resemblance to the alphabet with which many who experience a loss of vision are familiar, it is particularly inappropriate for those who lose their sight late in life, when the resources and motivation to learn braille may be inadequate.

Modifications and alternatives to braille have been proposed to improve readability. For example, U.S. Pat. No. 3,363,339 to Place discloses a new braille cell structure which uses non-uniform raised dots or embossments in regular braille locations, which enables the reader to identify the cell line or column to which a boss belongs, even when a row or column is blank. U.S. Pat. No. 43,197,889 to Micropoulou discloses an alternative tactile code to braille comprising forming the thirteen most frequently used consonants by upsetting from the surface of a sheet, patterns consisting of groups of projections in permutations and combinations of four, the projections being disposed at the corners of a square, while the remaining letters of the alphabet are similarly formed, but by patterns consisting of two groups placed side by side. Numbers are formed by patterns of two such groups, the pattern of the first group of which differs from the pattern of the first group of the two letter groups. However, even these codes bear little resemblance to the conventional Roman alphabet and Arabic numerals, and thus suffer from the same deficiencies as conventional braille.

In summary, no simple tactile code exists which bears resemblance to the conventional alphabet and numerals and is therefore appropriate for use by those without the physical resources or motivation to learn braille. It is the solution of these problems to which the present invention is directed.

SUMMARY OF THE INVENTION

Therefore, it is the primary object of this invention to provide a system of embossed symbols which offers easily learned and readable letters and numbers, building on knowledge and skills which many visually impaired and blind people have already acquired.

It is another object of this invention to provide a system of embossed symbols which resemble the letters of the conventional Roman alphabet and the conventional Arabic numerals.

The foregoing and other objects of the invention are achieved by provision of a tactile code for use by visually impaired and blind persons comprising embossed alphabet symbols representing the letters of the conventional Roman alphabet and embossed numeral symbols representing the conventional Arabic numerals. The alphabet symbols are divided into first, second, third, and fourth regions or groups, the alphabet symbols in the first and third regions or groups being denoted by a circular frame, and the alphabet symbols in the second and fourth regions or groups being surrounded by a square frame. Each alphabet symbol embodies at least a physical association, such as a dominant characteristic, of its corresponding letter of the Roman alphabet. The numeral symbols are all denoted by a diamond frame, and each numeral symbol embodies either a logical or physical association with its corresponding Arabic numeral.

In one aspect of the code of my invention, some of the alphabet symbols comprise the entire corresponding conventional letter enclosed within the frame. In another aspect of the code of my invention, the interior portion of the symbol consists of a portion of the corresponding Roman letter. In still another aspect of the code of my invention, the frame alone or in combination with the interior portion of the symbol reproduces the corresponding capital letter of the Roman alphabet. Capital letters of the Roman alphabet are represented by a symbol having a double frame.

A better understanding of the disclosed embodiment of the invention will be achieved when the accompanying detailed description is considered in conjunction with the appended drawings, in which like reference numerals are used for the same parts as illustrated in the different figures.

BRIEF DESCRIPTION OF THE DRAWINGS

FIGS. 1(A)-1(Z) are a table showing the symbols in the tactile code of the invention for the letters A-Z;

FIGS. 2(1)-2(0) are a table showing the symbols in the tactile code of the invention for the numerals 1-9 and 0;

FIG. 3 is a perspective view of symbols of the tactile code of the invention spelling the word "sighted", being read with a fingertip;

FIG. 4 is an enlarged plan view of the symbol representing the letter "t";

FIG. 5 is a cross-sectional view taken along line 5—5 of FIG. 4; and

FIG. 6 is an enlarged plan view of the symbols for the letters "A" and "E".

DESCRIPTION OF THE PREFERRED EMBODIMENT

Referring now to FIGS. 1 and 2, there are shown tables of the tactile code according to my invention. FIGS. 1(A)-1(Z) are the alphabet symbols representing the letters a-z of the conventional Roman alphabet, while FIGS. 2(1)-2(0) represent the numerals symbols representing the conventional arabic numerals 1-9 and 0. As shown in FIGS. 3-6, these symbols are embossed, preferably on a heavy grade of paper. The use of existing embossing techniques is contemplated. If the symbol height is sufficient, the symbols can be traced with the fingertips much more easily than braille dots.

Referring now to FIGS. 1 and 3-6, all of the alphabet symbols comprise at least a frame 20, and all but two of the alphabet symbols (the symbols corresponding to the Roman letters "l" and "o,") also comprise an interior portion 30 surrounded by the frame 20. The alphabet symbols resemble those of the conventional Roman alphabet in that each of the alphabet symbols embodies at least a physical association with its corresponding letter of the Roman alphabet. Specifically, each alphabet symbol reproduces either the entire letter of the Roman alphabet or one of its dominant characteristics, such a tail, bar, or diagonal. In some symbols (those corresponding to the Roman letter "c", "s", "v", and "x", for example), the interior portion of the symbol reproduces the entire corresponding capital letter of the Roman alphabet. In other symbols (those corresponding to the Roman letters "d", "e", "f", "h", "m", "n", "t", and "w", for example), the interior portion in combination with at least part of the frame reproduces the entire corresponding capital letter of the Roman alphabet. The alphabet symbols can also use a logical association (for example, the alphabet symbol for the Roman letter "i" resembles an eye).

The alphabet symbols are divided into first, second, third, and fourth regions or groups, shown in FIGS. 1(A)-1(D), 1(E)-1(N), 1(O)-1(S), and 1(T)-1(Z), respectively. These regions or groups correspond to the letters a-d, inclusive, e-n, inclusive, o-s, inclusive, and t-z, inclusive, respectively. The alphabet symbols in the first and third regions have a circular frame and the alphabet symbols in the second and fourth regions have a square frame, so that letters in adjacent regions have differently shaped frames. Thus, when the reader encounters a circle, for example, he or she knows that he or she is dealing with a letter from the first or third region. The frames therefore serve as the primary key to direct the reader to a limited number of candidates, to make deciphering as swift and as easy as possible. I have reserved the most easily traced symbols for vowels and for frequently used letters. As shown in FIG. 6, the capital letters of the Roman alphabet are represented in my code by alphabet symbols having double frames 20 and 20'.

Referring now to FIG. 2, all of the numeral symbols also comprise a frame, and all but one of the numeral symbols (the numeral symbol corresponding to the Arabic numeral "0") also comprise an interior portion surrounded by the frame. All of the numeral symbols have a diamond frame, and each of the numeral symbols embodies either a logical or physical association or both with its corresponding Arabic numeral.

An explanation of the physical and logical associations of each of the alphabet and numeral symbols of the tactile code of the invention is given below:

|  |  | Physical Association | Logical Association | Explanation |
|---|---|---|---|---|
| Letter: | a | yes | no | dominant characteristic |
|  | b | yes | no | dominant characteristic, bar |
|  | c | yes | no | fully represented |
|  | d | yes | no | fully represented |
|  | e | yes | no | fully represented |
|  | f | yes | no | dominant characteristic, bar |
|  | g | yes | no | dominant characteristic, tail |
|  | h | yes | no | dominant characteristic, bar |
|  | i | yes | yes | dominant characteristic, "eye" |
|  | j | yes | no | dominant characteristic, tail |
|  | k | yes | no | dominant characteristic, diagonal |
|  | l | yes | no | fully represented |
|  | m | yes | no | dominant characteristic, diagonal |
|  | n | yes | no | fully represented |
|  | o | yes | yes | fully represented, inherent in frame, "0!" |
|  | p | yes | no | dominant characteristic, bar |
|  | q | yes | no | dominant characteristic, tail |
|  | r | yes | no | dominant characteristic, diagonal |
|  | s | yes | no | fully represented |
|  | t | yes | no | fully represented |
|  | u | yes | no | fully represented |
|  | v | yes | no | dominant characteristic, diagonal |
|  | w | yes | no | dominant characteristic, diagonal |
|  | x | yes | no | fully represented |
|  | y | yes | no | dominant characteristic, tail |
|  | z | yes | no | fully represented |
| Number: | 1 | yes | no | fully represented |
|  | 2 | yes | yes | dominant characteristic, outline, clock position touched |
|  | 3 | yes | yes | dominant characteristic, outline, clock position touched |
|  | 4 | yes | yes | dominant characteristic, outline, clock position touched |
|  | 5 | no | yes | plenitude, half way |
|  | 6 | no | yes | clock position touched |
|  | 7 | yes | yes | dominant characteristic, outline, clock position touched |
|  | 8 | yes | no | dominant characteristic, outline, clock position touched |
|  | 9 | no | yes | clock position touched |
|  | 0 | no | yes | plenitude, zero or empty |

Thus it will be seen that the present invention provides a unique tactile code for use by visually impaired and blind persons. While a preferred embodiment of the invention has been disclosed, it should be understood that the spirit and scope of the invention is to be limited solely by the appended claims, since numerous modifications of the disclosed embodiment will undoubtedly occur to those of skill in the art.

I claim:

1. A tactile code for use by visually impaired and blind persons comprising embossed alphabet symbols representing the letter of the conventional Roman alphabet and embossed numeral symbols representing the conventional Arabic numerals;

all of said alphabet and said numeral symbols comprising at least a frame, and at least of some said alphabet symbols and said numerals symbols also comprising an interior portion surrounded by said frame;

said alphabet symbols being divided into first, second, third, and fourth regions, said alphabet symbols in said first and third regions having a circular frame and said alphabet symbols in said second and fourth regions having a square frame, and each of said alphabet symbols embodying at least a physical association with its corresponding capital letter of the Roman alphabet; and said numeral symbols all having a diamond frame and each of said numeral symbols embodying at least a logical or physical association with its corresponding Arabic numeral.

2. The tactile code of claim 1, wherein capital letters of the Roman alphabet are represented by said alphabet symbols having double frames.

3. The tactile code of claim 1, said first region consisting of the Roman letters a–d, inclusive, said second region consisting of the Roman letters e–n, inclusive, said third region consisting of the Roman letters o–s, inclusive, and said forth region consisting of the Roman letters t–z, inclusive.

4. The tactile code of claim 1, wherein said interior portion of at least of one of said alphabet symbols reproduces a dominant characteristic of the corresponding capital letter of the Roman alphabet.

5. The tactile code of claim 1, wherein said interior portion of at least one of said alphabet symbols reproduces the entire corresponding capital letter of the Roman alphabet.

6. The tactile code of claim 1, wherein said interior portion in combination with at least part of said frame of at least one of said alphabet symbols reproduces the entire corresponding capital letter of the Roman alphabet.

7. A tactile code for use by visually impaired and blind persons comprising embossed alphabet symbols representing the letters of the conventional Roman alphabet;

all of said alphabet symbols comprising at least a frame and least some of said alphabet symbols also comprising an interior portion surrounded by said frame;

said alphabet symbols being divided into at least two regions, said alphabet symbols in adjacent regions having frames of different shapes, and each said alphabet symbol embodying at least a physical association with its corresponding letter of the Roman alphabet.

8. The tactile code of claim 7, further comprising embossed numeral symbols representing the conventional Arabic numerals, all of said numeral symbols having a frame of the same shape, the shape of said numeral symbol frame being different from those of said alphabet symbol frames and each of said numeral symbols embodying at least a logical or physical association with its corresponding Arabic numeral.

9. The tactile code of claim 7, wherein capital letters of the Roman alphabet are represented by said alphabet symbols having double frames.

10. The tactile code of claim 7, wherein said interior portion of at least one of said alphabet symbols reproduces a dominant characteristic of the corresponding letter of the Roman alphabet.

11. The tactile code of claim 7, wherein said interior portion of at least one of said alphabet symbols reproduces the entire corresponding letter of the Roman alphabet.

12. The tactile code of claim 7, wherein said interior portion in combination with at least a part of said frame of at least one of said alphabet symbols reproduces the entire corresponding letter of the Roman alphabet.

13. The tactile code of claim 7, said at least two regions having frames which are circles and squares.

14. The tactile code of claim 8, said numeral symbols having diamond frames.

* * * * *